(12) United States Patent
Levassort et al.

(10) Patent No.: US 6,919,403 B2
(45) Date of Patent: Jul. 19, 2005

(54) POLY(ETHYLENE PHENYLENE ETHYNYLENE SILYLENES) COMPRISING AN INERT SPACER AND METHODS FOR PREPARING SAME

(75) Inventors: Christian Levassort, Tours (FR); Franck Jousse, Tours (FR); Laurent Delnaud, Ballan (FR); Pierrick Buvat, Nontbazon (FR)

(73) Assignee: Commissariat a l'Energie Atomique (FR)

( * ) Notice: Subject to any disclaimer, the term of this patent is extended or adjusted under 35 U.S.C. 154(b) by 44 days.

(21) Appl. No.: 10/415,644

(22) PCT Filed: Nov. 9, 2001

(86) PCT No.: PCT/FR01/03497

§ 371 (c)(1),
(2), (4) Date: May 1, 2003

(87) PCT Pub. No.: WO02/38652

PCT Pub. Date: May 16, 2002

(65) Prior Publication Data

US 2004/0030170 A1 Feb. 12, 2004

(30) Foreign Application Priority Data

Nov. 10, 2000 (FR) ............................................ 00 14459

(51) Int. Cl.$^7$ .............................................. C08G 77/48
(52) U.S. Cl. ........................... 525/25; 526/285; 528/35; 528/43
(58) Field of Search .............................. 528/35, 25, 43; 526/285

(56) References Cited

U.S. PATENT DOCUMENTS 5,243,060 A 9/1993 Barton et al.
6,703,519 B1 * 3/2004 Buvat et al. .................. 556/431

FOREIGN PATENT DOCUMENTS

| EP | 0 617 073 A2 | 9/1994 | |
| FR | 2 798 662 A1 | 3/2001 | |
| WO | WO 200119899 A1 * | 3/2001 | ............. C07F/7/08 |

OTHER PUBLICATIONS

Corriu, et al., "Synthesis of Poly(alkynylsilanes) having Various aromatic Groups in the Backbone", Journal of Polymer Science Part C, Polymer Letters, 28, No. 13, pp. 431–437 (Dec. 1990).
Itoh, et al., New Highly Heat–Resistant Polymers Containing Silicon: Poly(silyleneethynylenephenyleneethynylene)s, Macromolecules, 30, pp. 694–701 (1997).
Liu, et al., "Copper(I) chloride catalyzed cross–dehydrocoupling reactions between silanes and ethynyl compounds. A new method for the copolymerization of silanes and alkynes", Can J. Chem, vol. 68, pp. 1100–1105 (1998).
Kuroki, et al., "Thermosetting mechanism Study of Poly(phenylsilylene)ethynylene–1, 3–phenyleethynylenel by Solid–State NMR Spectroscopy and Computational Chemistry", Macromolecules, 31, pp. 2804–2808 (1998).
Abstract of JP 7–126394.
Abstract of JP 10–110037.

* cited by examiner

*Primary Examiner*—Margaret G. Moore
*Assistant Examiner*—Marc S. Zimmer
(74) *Attorney, Agent, or Firm*—Foley & Lardner LLP

(57) ABSTRACT

The present invention relates to polymers of poly (ethynylene phenylene ethynylene silylene) type comprising an inert spacer in the main chain of the polymer.

The invention also relates to processes for preparing said polymers and to the cured products that may be obtained by heat-treating said polymers.

The polymers according to the invention may be used especially in matrices for composites.

31 Claims, No Drawings

POLY(ETHYLENE PHENYLENE ETHYNYLENE SILYLENES) COMPRISING AN INERT SPACER AND METHODS FOR PREPARING SAME

The present invention relates to polymers of poly (ethynylene phenylene ethynylene silylene) type comprising an inert spacer in the main chain of the polymer.

The invention also relates to processes for preparing said polymers and to the cured products that may be obtained by heat-treating said polymers.

The polymers according to the invention may be used especially in matrices for composites.

The technical field of the present invention may be defined as that of heat-stable plastics, i.e. polymers that can withstand high temperatures that may, for example, be up to 600° C.

The industrial needs for such heat-stable plastics have increased enormously in recent decades, in particular in the electronics and aerospace fields.

Such polymers have been developed to overcome the drawbacks of the materials previously used in similar applications.

Specifically, it is known that metals such as iron, titanium and steel have very high heat resistance, but they are heavy. Aluminium is light, but has low heat resistance, i.e. up to about 300° C. Ceramics such as SiC, $Si_3N_4$ and silica are lighter than metals and very heat-resistant, but they are not mouldable. It is for this reason that many plastics have been synthesized, which are light, mouldable and have good mechanical properties; they are essentially carbon-based polymers.

Polyimides have the highest heat resistance of all plastics, with a thermal deformation temperature of 460°0 C.; however, these compounds, which are listed as being the most stable currently known, are very difficult to use. Other polymers such as polybenzimidazoles, polybenzothiazoles and polybenzoxazoles have even higher heat resistance than that of polyimides, but they are not mouldable and are flammable.

Silicon-based polymers such as silicones or carbosilanes have also been intensively studied. These polymers, such as poly(silylene ethynylene) compounds, are generally used as precursors of ceramics of silicon carbide SiC type, reserve compounds and conductive materials.

It has recently been shown in document [4] that poly [(phenyl silylene) ethynylene-1,3-phenylene ethynylene] (or MSP), prepared by a synthetic process involving polymerization reactions by dehydrocoupling between phenylsilane and m-diethynylbenzene, have remarkably high heat stability. This is confirmed in document [1], which more generally demonstrates the excellent heat-stability properties of poly (silylene ethynylene phenylene ethynylenes) which comprise a repeating unit represented by formula (A) below:

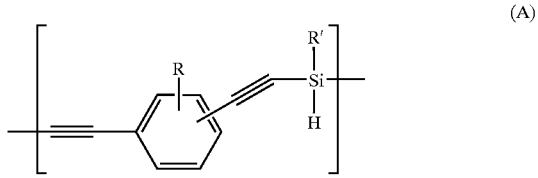

(A)

The synthesis of polycarbosilanes comprising a silane function and a diethynylbenzene via standard processes using metal catalysts leads to polymers of low purity having large traces of metal catalyst, which greatly impair their thermal properties.

Other improved synthetic processes are presented in document [2]: these are palladium-catalyzed syntheses, but they apply only to a very limited number of specific polymers in which the silicon bears two phenyl or methyl groups, for example.

In particular, it will be noted that the compounds whose repeating unit has been described above by formula (A) cannot be synthesized by this process. It is found that the SiH bonds of such compounds that are particularly difficult to obtain are very advantageous since they are extremely reactive and can give rise to numerous rearrangements and reactions.

Another process of cross-dehydrocoupling of silanes with alkynes in the presence of a catalytic system based on copper chloride and an amine is described in document [3]. However, this process is also limited to a few polymers and results in compounds whose structure is partially crosslinked and whose mass-average molecular weight is very high ($10^4$ to $10^5$). These structural defects seriously impair both the solubility properties and the thermal properties of these polymers.

Another synthetic process that is directed towards overcoming the drawbacks of the processes described above, and towards preparing pure compounds, without traces of metals, and with excellent and well-defined properties, especially in terms of heat stability, was proposed in the above-mentioned document [4]. This process essentially allows the synthesis of the compounds of formula (A) above in which the silicon bears a hydrogen atom. The process according to [4] is a polycondensation by dehydrogenation of a functionalized hydrosilane with a compound of diethynyl type in the presence of a metal oxide such as MgO, according to the reaction scheme (B) below:

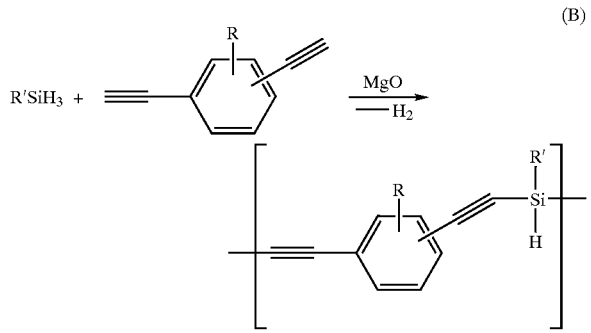

(B)

This process leads to weakly crosslinked polymers having, as represented above, excellent heat stability, but whose mass distribution is, however, very broad.

In another, more recent publication [1], the same authors prepared a series of polymers comprising the —Si(B)— C≡C— unit via process (B) and via another more advantageous process, involving the condensation reaction of dichlorosilane and of organomagnesium reagents followed by reaction of the product obtained with a monochlorosilane, followed by a hydrolysis, according to the reaction scheme (C) below:

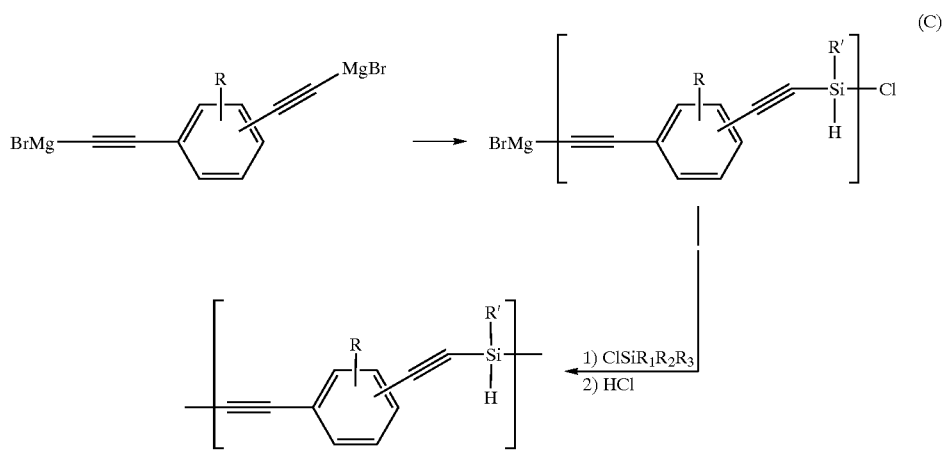

(C)

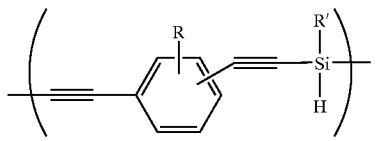

In contrast with process (B), process (C) allows the production of polymers without structural defects, with good yields and a low mass distribution.

The compounds obtained by this process are totally pure and have fully characterized thermal properties. They are thermosetting polymers.

Said document also discloses the preparation of the polymers mentioned above reinforced with glass, carbon or SiC fibres.

A patent relating to polymers comprising the very general repeating unit (D):

(D)

in which R and R' are numerous groups known in organic chemistry, was granted to the authors of documents [1] and [4]; this is document EP-B1-0 617 073 (corresponding to American patent U.S. Pat. No. 5,420,238).

These polymers are prepared essentially by the process of scheme (C) and possibly by the process of scheme (B), and they have a weight-average molecular mass from 500 to 1 000 000. Said document also describes cured products based on these polymers and their preparation by a heat treatment. It is indicated that the polymers in said document can be used as heat-stable polymers, fire-resistant polymers, conductive polymers, and materials for electroluminescent elements. In fact, it appears that such polymers are essentially used as organic precursors of ceramics.

The excellent heat stability of the polymers prepared especially in document EP-B1-0 617 073 makes them capable of constituting the resin forming the organic matrix of heat-stable composite materials.

Many techniques for producing composites exist.

In very general terms, the various processes involve injection techniques (especially RTM) or prepreg compacting techniques.

Prepregs are semi-finished products, of low thickness, consisting of fibres impregnated with resin. Prepregs that are intended for producing high-performance composite structures contain at least 50% fibre by volume.

Also, during use, the matrix will have to have a low viscosity in order to penetrate the reinforcing sheet and correctly impregnate the fibre so as to prevent it from distorting and conserve its integrity. Reinforcing fibres are impregnated either with a solution of resin in a suitable solvent, or with the pure resin melt; this is the "hot-melt" technique. The technology for manufacturing prepregs with a thermoplastic matrix is substantially governed by the morphology of the polymers.

Injection-moulding is a process that consists in injecting the liquid resin into the textile reinforcing. agent positioned beforehand in the imprint consisting of the mould and the counter-mould. The most important parameter is the viscosity, which must be between 100 and 1000 mpa.s at the injection temperature, which is generally from 50 to 250° C.

For these two techniques, the viscosity is thus the critical parameter, which conditions the ability of the polymer to be used.

Amorphous polymers correspond to macromolecules with a totally disordered skeleton structure. They are characterized by their glass transition temperature (Tg) corresponding to the change from the vitreous state to the rubbery state. Above the Tg, the thermoplastics are characterized, however, by great creep strength.

The polymers prepared in document EP-B1-0 617 073 are compounds that are in powder form. The inventors have shown, by reproducing the syntheses described in said document, that the polymers prepared would have glass transition temperatures in the region of 50° C.

Below this temperature, the viscosity of the polymer is infinite, and above this temperature, the viscosity decreases gradually as the temperature is increased.

However, this drop in viscosity is not sufficient for the polymer to be able to be used in processes conventionally used in the field of composites such as RTM and preimpregnation, already described above.

Moreover, since the prepolymers prepared in document EP-B1-0 617 073 are heat-setting, the crosslinking of these materials is heat-activated.

The reactions involved in this phenomenon mainly involve two mechanisms, which are described in an article published by Itoh [5].

The first mechanism is a Diels-Alder reaction, involving an acetylenic bond coupled to an aromatic nucleus, on the one hand, and another aromatic bond, on the other hand. This reaction may be illustrated in the following manner:

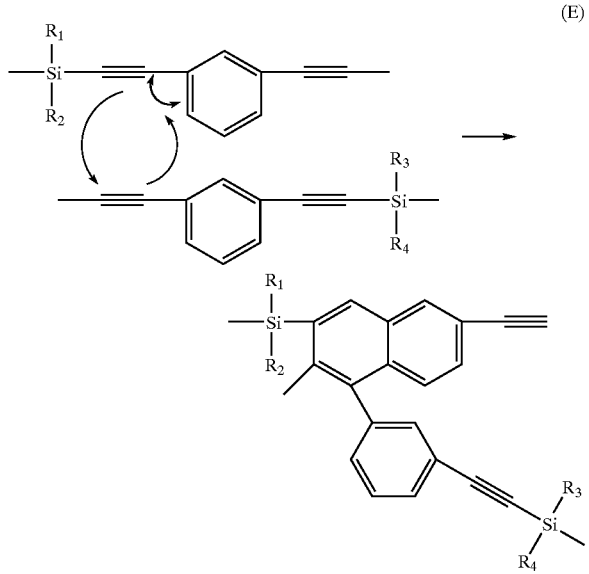

(E)

This reaction generates a naphthalene unit. It can take place irrespective of the nature of $R_1$, $R_2$, $R_3$ or $R_4$.

The structures obtained by this mechanism are thus highly aromatic and comprise many unsaturated bonds.

These characteristics are the source of the excellent thermal properties observed for these polymers.

The second mechanism, which takes place during the crosslinking reaction of the poly(ethynylene phenylene ethynylene silylene) prepolymers, is a hydrosilylation reaction, involving the SiH bond and an acetylenic triple bond. This reaction may be illustrated in the following manner:

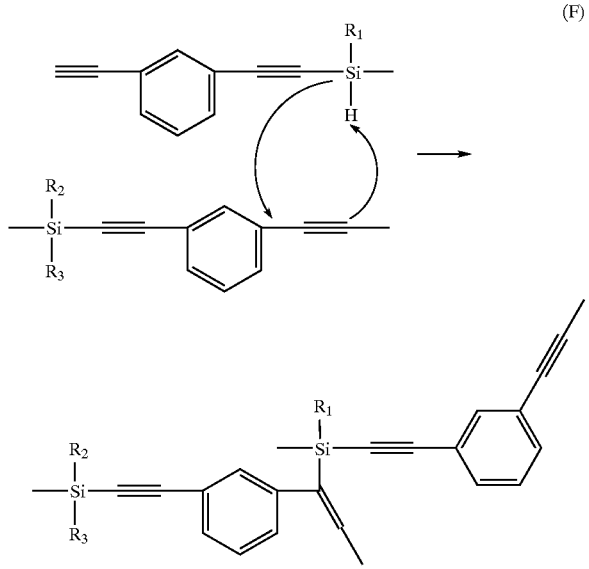

(F)

This reaction takes place only for compounds whose silicon bears the SiH bond.

For the latter compounds, the hydrosilylation reaction is activated in the same temperature ranges as the Diels-Alder reactions.

A polymer network is, inter alia, defined by the crosslinking density and by the length of the chain units that separate two crosslinking points. These characteristics predominantly govern the mechanical properties of the polymers. Thus, highly crosslinked networks with short chain units are classified in the range of materials with low deformability. Phenolic resins or phenolic cyanate ester resins especially form part of this category of materials.

In the case of poly(ethynylene phenylene ethynylene silylenes), the crosslinking involves the acetylenic triple bonds, simply separated by an aromatic nucleus. Consequently, the crosslinking density is very high and the inter-node chain units are very short. Cured materials based on poly(ethynylene phenylene ethynylene silylenes) are consequently among the polymer matrices with low deformability.

The crosslinking density may be controlled during the use of the polymer via suitable heat treatments. Specifically, the crosslinking of the polymer stops when the mobility of the macromolecular chains is no longer sufficient. It is accepted that this mobility is sufficient once the working temperature is above the glass transition temperature of the network. Consequently, the glass transition temperature cannot exceed the working temperature, and the crosslinking density is thus controlled by the curing temperature of the polymer.

However, under-crosslinked materials are unstable materials whose use, at temperatures above the working temperature, will give rise to a change in the structure.

The mechanical properties of poly(ethynylene phenylene ethynylene silylenes) are, consequently, difficult to regulate via heat treatment. However, the nature of the chemical groups borne by the silicon is capable of regulating these properties. Specifically, long chains may act as plasticizers and reduce the rigidity of the associated materials. However, this principle encounters limits in terms of the heat stability of the polymer, since this stability is then affected.

There is thus a need for a polymer of polyethynylene phenylene ethynylene silylene type, which, while displaying all the advantageous properties of these polymers, especially in terms of heat stability, also has regulable, improved mechanical properties.

Preferably, this polymer must have a viscosity that is low enough for it to be usable, manipulable or "processable" at temperatures of, for example, 100 to 120° C., which are the temperatures commonly used in injection or impregnation techniques.

The aim of the present invention is to provide polymers that satisfy these needs, inter alia, which do not have the defects, drawbacks, limitations and disadvantages of the polymers of the prior art as represented in particular by document EP-B1-0 617 073, and which solve the problems of the prior art.

The aim of the invention is also to provide a process for preparing said polymers.

This aim, and others, are achieved in accordance with the invention by means of a poly(ethynylene phenylene ethynylene silylene) polymer, in which said polymer comprises at least one repeating unit comprising two acetylenic bonds, at least one silicon atom, and at least one inert spacer group; said polymers also comprising, at the end of the chain, groups (Y) derived from a chain-limiting agent.

The term "inert spacer group" generally means a group that does not participate in or does not react during crosslinking. The repeating unit may be repeated $n_3$ times.

Fundamentally, the polymer according to the invention comprises at least one repeating unit comprising at least one spacer group that is not involved in a crosslinking process, to which the polymer according to the invention may be subsequently subjected.

The presence of such a spacer group in polymers of poly(ethynylene phenylene ethynylene silylene) type is not mentioned in the prior art. Surprisingly, this fundamental structural characteristic of the polymers according to the invention greatly improves the mechanical properties of the polymers without significantly modifying their thermal properties, which remain excellent.

Consequently, by virtue of its specific structure, the polymer according to the invention, characterized especially by the presence of a spacer group, provides a solution to the problems of the polymers of the prior art.

Without wishing to be bound by any theory, the role of the spacer is especially to act as an inter-node crosslinking chain unit that is large enough to allow movements within the network.

In other words, the at least one spacer group serves spatially to space apart the triple bonds of the polymer, whether these triple bonds belong to the same repeating unit or to two different consecutive repeating units. The spacing between two triple bonds or acetylenic functions, provided by the spacer group, generally consists of linear molecules and/or of several linked aromatic nuclei, optionally separated by single bonds.

The spacer group defined above may be readily chosen by a person skilled in the art.

The choice of the nature of the spacer group also makes it possible to regulate the mechanical properties of the polymers of the invention, without significantly modifying the thermal properties.

The spacer group(s) may be chosen, for example, from groups comprising several aromatic nuclei linked via at least one covalent bond and/or at least one divalent group, polysiloxane groups, polysilane groups, etc.

When there are several spacer groups, there are preferably two of them, and they may be identical or chosen from all the possible combinations of two or more of the groups mentioned above.

Depending on the spacer group chosen, the repeating unit of the polymer according to the invention may thus correspond to several formulae.

The polymer according to the invention may be a polymer comprising a repeating unit of formula (I):

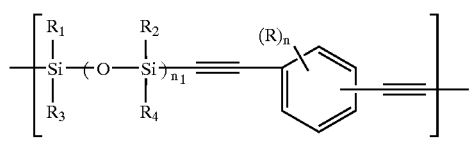

(I)

in which the phenylene group of the central repeating unit may be in the o, m or p form; R represents a halogen atom (such as F, Cl, Br or I), an alkyl group (linear or branched) having from 1 to 20 carbon atoms, a cycloalkyl group having from 3 to 20 carbon atoms (such as methyl, ethyl, propyl, butyl or cyclohexyl), an alkoxy group having from 1 to 20 carbon atoms (such as methoxy, ethoxy or propoxy), an aryl group having from 6 to 20 carbon atoms (such as a phenyl group), an aryloxy group having from 6 to 20 carbon atoms (such as a phenoxy group), an alkenyl group (linear or branched) having from 2 to 20 carbon atoms, a cycloalkenyl group having from 3 to 20 carbon atoms (such as vinyl, allyl or cyclohexenyl), an alkynyl group having from 2 to 20 carbon atoms (such as ethynyl or propargyl), an amino group, an amino group substituted with one or two substituents having from 2 to 20 carbon atoms (such as dimethylamino, diethylamino, ethylmethylamino or methylphenylamino) or a silanyl group having from 1 to 10 silicon atoms (such as silyl, disilanyl (—$Si_2H_5$), dimethylsilyl, trimethylsilyl and tetramethyldisilanyl), one or more hydrogen atoms linked to the carbon atoms of R, may be replaced with halogen atoms (such as F, Cl, Br and I), alkyl groups, alkoxy groups (such as methoxy, ethoxy and propoxy), aryl groups, aryloxy groups (such as a phenoxy group), amino groups, amino groups substituted with one or two substituents or silanyl groups; $R_1$, $R_2$, $R_3$ and $R_4$, which may be identical or different, represent a hydrogen atom; an alkyl group having from 1 to 20 carbon atoms, a cycloalkyl group having from 3 to 20 carbon atoms, an alkoxy group having from 1 to 20 carbon atoms, an aryl group having from 6 to 20 to carbon atoms, an aryloxy group having from 6 to 20 carbon atoms, an alkenyl group having from 2 to 20 carbon atoms, a cycloalkenyl group having from 3 to 20 carbon atoms, an alkynyl group having from 2 to 20 carbon atoms, one or more of the hydrogen atoms linked to the carbon atoms of $R_1$, $R_2$, $R_3$ and $R_4$ possibly being replaced with halogen atoms, alkyl groups, alkoxy groups, aryl groups, aryloxy groups, amino groups, disubstituted amino groups or silanyl groups; examples of these groups have already been mentioned above for R, n is an integer from 1 to 4, and $n_1$ is an integer from 1 to 10 and preferably from 1 to 4; this repeating unit is generally repeated $n_3$ times, with $n_3$ being an integer, for example from 2 to 100.

Alternatively, the polymer according to the invention may be a polymer comprising a repeating unit of formula:

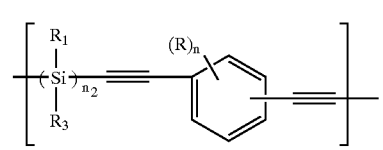

(II)

in which the phenylene group may be in the o, m or p form, and R, $R_1$, $R_3$ and n have the meaning already given above and $n_2$ is an integer from 2 to 10.

This repeating unit is generally repeated $n_1$ times, with $n_1$ being an integer, for example from 2 to 100.

Alternatively, the polymer according to the invention may be a polymer comprising a repeating unit of formula:

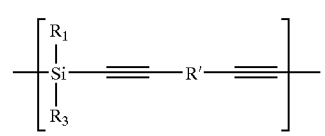

(III)

in which $R_1$ and $R_3$ have the meaning already given above, and R' represents a group comprising at least two aromatic nuclei comprising, for example, from 6 to 20 C, linked via at least one covalent bond and/or at least one divalent group, this repeating unit is generally repeated $n_2$ times, with $n_2$ being as defined above.

Alternatively, the polymer according to the invention may be a polymer comprising a repeating unit of formula:

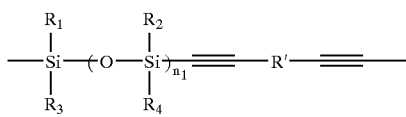
(IV)

in which $R_1$, $R_2$, $R_3$, $R_4$, R' and $n_1$ have the meaning already given above, this repeating unit similarly possibly being repeated $n_3$ times.

Finally, the polymer according to the invention may be a polymer comprising a repeating unit of formula:

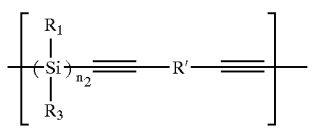
(V)

in which $R_1$, $R_3$, R' and $n_2$ have the meaning already given above, this unit possibly being repeated $n_2$ times.

In particular, in formulae (III), (IV) and (V) above, R' represents a group comprising at least two aromatic nuclei separated by at least one covalent bond and/or a divalent group.

The group R' may be chosen, for example, from among the following groups:

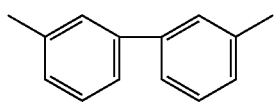
(VI)

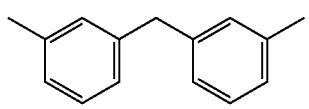
(VII)

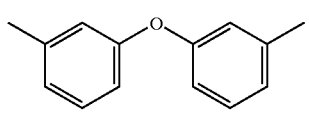
(VIII)

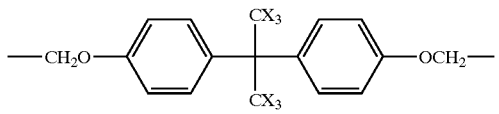
(IX)

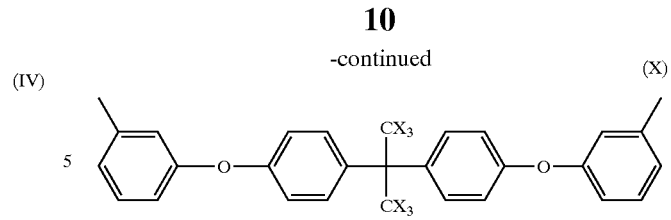
(X)

in which X represents a hydrogen atom or a halogen atom (F, Cl, Br or I).

Alternatively, the polymer according to the invention may comprise several different repeating units comprising at least one inert spacer group.

Said repeating units are preferably chosen from among the repeating units of formulae (I), (II), (III), (IV) and (V) already described above.

Said repeating units are repeated $x_1$, $x_2$, $x_3$, $x_4$ and $x_5$ times, respectively, in which $x_1$, $x_2$, $x_3$, $x_4$ and $x_5$ generally represent integers from 0 to 100 000, with the proviso that at least two from among $x_1$, $x_2$, $x_3$, $x_4$ and $x_5$ are other than 0.

This polymer may optionally further comprise one or more repeating units not comprising an inert spacer group, such as a unit of formula (Va):

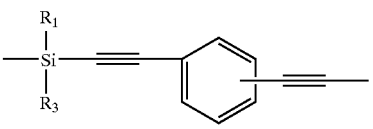
(Va)

This unit is generally repeated $x_6$ times, with $x_6$ representing an integer from 0 to 100 000.

A preferred polymer corresponds, for example, to the formula:

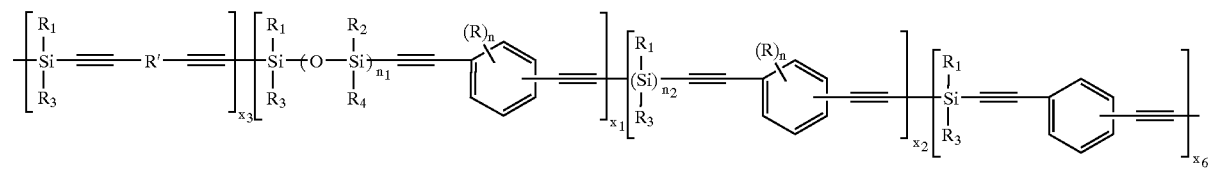
(Ia)

in which $x_1$, $x_2$, $x_3$, $x_6$ are as defined above, with the proviso that two from among $x_1$, $x_2$ and $x_3$ are other than 0.

The polymers according to the invention comprise, at the end of the chain, (end) groups (Y) derived from a chain-limiting agent, which makes it possible to control and regulate their length, their molecular mass and thus their viscosity.

The polymers according to the invention, compared with the polymers of document EP-B1-0 617 073, are distinguished, especially, fundamentally due to the fact that at least one spacer group is present in the repeating unit.

These polymers of the present invention are also distinguished due to the fact that groups Y derived from a chain-limiting agent are present at the end of the chain.

These structural differences have very little influence on the advantageous properties of these polymers, in particular the heat-stability properties of the polymer, which are virtually unaffected.

On the other hand, the mechanical properties, such as the deformability or the breaking stress, are greatly improved by the presence of the spacer group(s).

In addition, the presence at the end of the chain of a chain-limiting group has the effect, precisely, that the polymer of the invention has a determined, fully defined length and thus molecular mass.

Consequently, the polymer according to the invention also advantageously has fully defined and regulable rheological properties.

The nature of the chain-limiting group Y depends on the nature of the chain-limiting agent from which it is derived; Y may represent a group of formula:

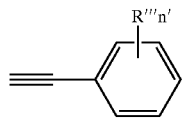

(XI)

in which R''' has the same meaning as R and may be identical to or different from the latter, and n' has the same meaning as n and may be identical to or different from the latter.

Y may also represent a group of formula (XII):

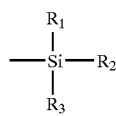

(XII)

in which $R_1$, $R_2$ and $R_3$, which may be identical or different, have the meaning already given above.

The molecular mass of the polymers according to the invention is—due to the fact that they comprise a chain-limiting grown—fully defined, and the length of the polymer and thus its molecular mass may be readily controlled by means of dosed additions of chain limiter into the reaction mixture, which is reflected by variable proportions of chain-limiting group Y in the polymer.

Thus, according to the invention, the molar ratio of the chain-limiting groups Y at the end of the chain to the repeating units of ethynylene phenylene ethynylene silylene type is generally from 0.01 to 1.5. This ratio is preferably from 0.25 to 1.

Similarly, according to the invention, the molar proportion of the chain-limiting groups Y at the end of the chain is generally from 1% to 60% and preferably from 20% to 50% of the polymer according to the invention.

The number-average molecular mass of the polymers according to the invention is generally from 400 to 1 000 000, and the weight-average molecular mass is from 500 to 1 000 000.

The number-average molecular mass of the polymers according to the invention is, due to the fact that they comprise a chain-limiting group, fully defined, and is generally from 400 to 5000, and the weight-average molecular mass is from 600 to 10 000.

These masses are determined by gel permeation chromatography (GPC) via calibration with polystyrene.

According to the invention, by virtue of the fact that the polymer contains chain-limiting groups, controlling the molecular mass of the polymers, which is generally in the range mentioned above, makes it possible to fully control the viscosity of the polymers.

Thus, the viscosities of the polymers according to the invention are in a range of values from 0.1 to 1000 mPa.s for temperatures ranging from 20 to 160° C., within the mass range mentioned above.

The viscosity also depends on the nature of the groups borne by the aromatic rings and the silicon. These viscosities, which cannot be obtained with the polymers of the prior art, are entirely compatible with the standard techniques for preparing composites.

According to the invention, it is thus possible to modify the viscosity of the polymer as desired, as a function of the technological working constraints of the composite.

The viscosity is moreover associated with the glass transition temperature (Tg). The glass transition temperature of the polymers according to the invention will thus generally be from −250 to +10° C., which is very much lower than the glass transition temperatures of the polymers of the prior art.

The invention also relates to a first process for preparing a polymer according to the invention, preferably of determined molecular mass, bearing at the end of the chain groups derived from a chain-limiting agent, said polymer especially corresponding to formula (I), (II), (III), (IV) or (V) given above.

Said process comprises the reaction of a Grignard reagent of general formula:

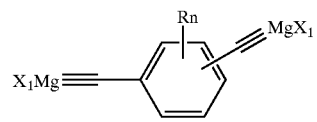

(XIII)

or of general formula:

$$X_1Mg\equiv R'\equiv MgX_1$$ (XIV)

in which the phenylene group (formula (XIII)) may be in the o, m or p form, and R, R' and n have the meaning given above, and $X_1$ represents a halogen atom such as Cl, Br, F or I (preferably, $X_1$ is Cl), as a mixture with a chain-limiting agent, for example of formula:

$$Y-MgX_1$$ (XV)

$X_1$ having the meaning already given above, and Y is a group chosen from the groups of formula:

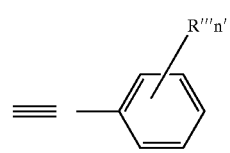

(XVI)

in which R''' has the same meaning as R and may be identical to or different from the latter, and n' has the same meaning as n and may be identical to or different from the latter;

with a dihalide (dihalosilane or dihalosiloxane) of formula (XVII) (a, b or c):

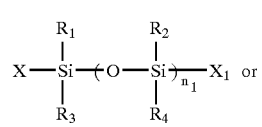

(XVIIa)

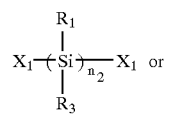

(XVIIb)

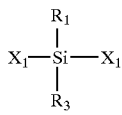
(XVIIc)

in which $R_1$, $R_2$, $R_3$ and $R_4$, which may be identical or different, $X_1$, $n_1$ and $n_2$ have the meaning already given above, $X_1$ preferably being Cl, in the presence of an aprotic solvent, followed by a hydrolysis step to give the final polymer of formula (I), (II), (III), (IV) or (V), respectively.

In other words, the polymers of formula (I), (II), (III), (IV) or (V), respectively, are obtained by reaction of (XIII) and (XVIIa); (XIII) and (XVIIb); (XIV) and (XVIIc), (XVIIa) and (XVIIb), respectively.

It will be noted that, due to the fact that the reaction involves a chain limiter, the hydrolysis is thus performed directly.

The invention also relates to a second process for preparing a polymer of poly(ethynylene phenylene ethynylene silylene) type, preferably of determined molecular mass, bearing at the end of the chain groups derived from a chain-limiting agent, said polymer corresponding to formula (I), (II), (III), (IV) or (V) given above.

Said process comprises the reaction of a compound of formula (XVIII):

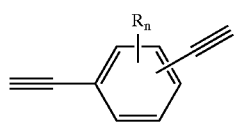
(XVIII)

or of general formula:

(XIX)

in which the phenylene group (general formula (XVIII)) may be in the o, m or p form and R and n have the meaning already given above, as a mixture with a chain-limiting agent, for example of formula (XX):

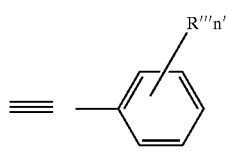
(XX)

in which R''' has the same meaning as R and may be identical to or different from the latter, and n' has the same meaning as n and may be identical to or different from the latter, with a compound of formula (XXI) (a, b or c):

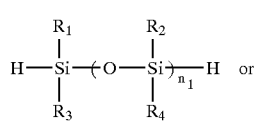
(XXIa)

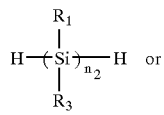
(XXIb)

(XXIc)

in which $R_1$, $R_2$, $R_3$ and $R_4$, which may be identical or different, and $n_1$ and $n_2$ have the meaning already given above, in the presence of a basic metal oxide, to give the final compound of formula (I), (II), (III), (IV) or (V), respectively.

In other words, the polymers of formula (I), (II), (III), (IV) or (V), respectively, are obtained by reaction of (XVIII) and (XXIa); (XVIII) and (XXIb) respectively; (XIX) and (XIXc), (XIXa) and (XIXb), respectively.

According to the invention, and surprisingly, controlling the masses of the polymers according to the invention is obtained by adding to the reaction medium a reactive species, also known as a chain-limiting agent, which blocks the polymerization reaction without affecting the overall reaction yield.

This reactive species is generally an analogue of one of the main reagents, but which bears only one function allowing coupling. When this species is introduced into the polymer chain, the growth is stopped.

By effecting dosed additions of chain limiter, it is possible according to the invention to readily control the length of the polymer and, consequently, its viscosity.

The fundamental principle of both the first process according to the invention and the second process according to the invention, in their advantageous embodiment, i.e. controlling the molecular mass and thus the viscosity of the polymer by adding to the reaction mixture a chain-limiting agent, is identical.

The same principle may be applied with minor adjustments to the other possible processes for synthesizing the polymers according to the invention.

Whether it is in the first process or in the second process, the length of the polymer and thus its molecular mass, and consequently its viscosity, are in direct correlation with the molar percentage of chain-limiting agent. This molar percentage is defined by the molar ratio of the chain-limiting agent to the total number of moles of chain-limiting agent and of diacetylenic compounds of formula (XIII) or (XIV) or (XVII) or (XIX)×100. This percentage may range from 1% to 60% and preferably from 20% to 50%.

There was no indication in the literature, in particular in the documents mentioned above, relating to regulating and controlling the molecular masses of polymers of the poly(silylene ethynylene) type, and even less so was there any mention in the prior art documents of a relationship linking the molecular mass distribution to the viscosities of these polymers.

Thus, the fact of choosing to introduce a chain limiter into the polymer synthesis mixture in order to control its molecular mass is neither disclosed nor suggested in the prior art.

In the case of the synthetic process using a metal oxide, as described in documents [1] and [4] and patent EP-B1-0 617 073, and which corresponds substantially to the second preparation process according to the invention, the molecular mass is linked to the degree of activation of the catalyst [4]. Since this catalyst is highly hygroscopic, it is very difficult to predict the molecular masses, in principle. The less active the catalyst the lower the masses, but this decrease is accompanied by a significant decrease in the polymerization reaction yield. Moreover, the distribution may turn out to be so broad that several fractions of different mass may be isolated by selective fractionation.

In the case of synthesis via magnesium reagents, described in document [1] and the abovementioned patent, and which corresponds substantially to the first preparation process according to the invention, it is clear that the molecular masses will be governed by the nature and amount of solvent and also by the reaction temperature. However, these parameters are very difficult to optimize and do not make it possible to vary the mass range significantly. Moreover, the reduction in masses is inevitably accompanied by a large reduction in reaction yield. Finally, the mass distribution is also influenced by the reaction stoichiometry. In the case of synthesis via magnesium reagents, this parameter will be relevant only if one of the two reagents is in very large excess, which will have the consequence of greatly limiting the yield.

According to the invention, use is made of a chain limiter and, surprisingly, none of the synthesis parameters mentioned above is modified, and an entirely different synthetic strategy is adopted using in the reaction medium a reactive species that blocks the polymerization reaction without affecting the overall reaction yield.

In addition, due to the use of a chain limiter, the first preparation process of the invention makes it possible to dispense with one step of the process of EP-B1-0 617 073 which involves a monohalo silyl compound, which induces shorter reaction times and also substantial savings in reagents.

The invention also relates to the cured product obtainable by heat-treating at a temperature from 50 to 700° C., the polymer described above.

According to the invention, this cured product generally has a number-average molecular mass of 400 to 5000 and a weight-average molecular mass of 600 to 10 000.

Finally, the invention also relates to a composite matrix comprising the polymer described above.

In detail, the first process for preparing a polymer of poly(ethynylene phenylene ethynylene silylene) type according to the invention is substantially analogous to that described in document EP-B1-0 617 073. However, according to the invention, it differs therefrom by the incorporation into the mixture of a chain-limiting agent, by the final treatment of the polymers and possibly by the molar ratio of the organomagnesium and dichlorosilane reagents. As regards the conditions of this process, reference may thus be made to said document EP-B1-0 617 073, which is incorporated into the present patent by reference.

The Grignard reagents of formula (XIII) used in the first preparation process according to the invention are especially those described in document EP-B1-0 617 073 on pages 5 to 7 (formulae (3) and (8) to (20)). The Grignard reagents of formula (XIV) are chosen, for example, from the compounds obtained from formulae (VI) to (X).

The chain-limiting agent of formula (XV) may be a monoacetylenic organomagnesium compound of formula:

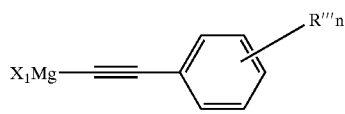

R''', $X_1$ and n' have already been defined above.

Examples of monohalosilanes used, for example, in the step preceding the hydrolysis are given in patent EP-B1-0 617 073 on page 9 (formula (5)).

Examples of the monoacetylenic compounds from which the monoacetylenic organomagnesium reagents (XV) are derived are the following: phenylacetylene, 4-ethynyltoluene, 4-ethynylbiphenyl, 1-ethynyl-4methoxybenzene.

The Grignard reagent (XIII) or (XIV), as a mixture with the chain-limiting compound corresponding to the above formula, is reacted with a dihalosilane, reproduced in one of the general formulae (XVIIa) to (XVIIc).

Examples of such dihalosilanes (for example those of formula (XVIIb)) are the dichlorosilanes described on pages 7 to 9 of patent EP-B1-0 617 073 and correspond especially to formulae (21) to (26) given in said document.

The conditions of the polymerization reaction are such that the solvent, the reaction time, the temperature,. etc. (with the exclusion of the "post-treatment") are substantially the same as those described in document EP-B1-0 617 073 to which reference is made, in particular to page 14.

The only differences in this actual polymerization step concern the addition of an additional chain-limiting reagent. The reaction conditions are otherwise substantially the same.

However, and according to the invention, preferably, in the advantageous case in which [lacuna] is used, the ratio of the number of acetylenic functions to the number of halogen functions borne by the silane must be as close as possible to 1 and preferably from 0.9 to 1.1. The molar ratio of phenylacetylene to diethynylbenzene is preferably between 0.01 and 1.5 and ideally between 0.25 and 1 (percentage from 1% to 60%).

This also applies to the case of the variant of the first process in which the chain limiter is a monohalosilane.

According to the invention, due to the fact that a chain limiter is used, following the polymerization reaction, a final hydrolysis step is performed directly, and one step is thus dispensed with compared with the similar process of the prior art, in particular in the case in which the chain limiter is an organomagnesium reagent.

Specifically, in document EP-B1-0 617 073, a post-treatment is performed on the polymer already prepared, the molecular mass of which is set, with a monohalosilane followed by a hydrolysis. It should be noted that, in this case, the monohalosilane does not act as a chain limiter since, in contrast with the present invention, it is not included in the starting reaction mixture and its action has no influence on the molecular mass of the polymer.

According to the invention, at the end of the reaction, the polymer is hydrolyzed with a volume, for example from 0.1 to 50 ml per gram of polymer, of an acidic solution, for example about 0.01 to 10 N hydrochloric acid or sulphuric acid.

The ideal solvent is tetrahydrofuran. In this case, the reaction mixture is then decanted and the solvent of the organic phase is replaced with a volume, for example from 0.1 to 100 ml per gram of polymer and ideally from 1 to 10 ml per gram of polymer, of any type of water-immiscible solvent, such as xylene, toluene, benzene, chloroform, dichloromethane or an alkane having more than 5 carbons. In the case of a reaction performed in a water-immiscible solvent, this step may be omitted. The organic phase is then washed, for example 1 to 5 times and preferably 2 to 3 times, with a volume of water, for example from 0.1 to 100 ml per gram of polymer and ideally from 1 to 10 ml per gram of polymer, so as to neutralize the organic phase and to extract therefrom all the impurities such as the magnesium salts and halogen salts. The pH of the organic phase should preferably be between 5 and 8 and ideally between 6.5 and 7.5. After evaporating off the solvent, the polymer is dried under a vacuum of between 0.1 and 500 mbar at a temperature of between 20 and 150° C. for a period of between 15 minutes and 24 hours.

The second process for preparing the polymers according to the invention is a process involving a dehydrogenation in the presence of a basic metal oxide.

Such a process differs essentially from the similar process described in documents [1] and [4] and also in document EP-B1-0 617 073 only in that a chain-limiting agent is added to the reaction mixture.

The reaction mixture comprises a compound of formula (XVIII), for example: 1,3-diethynylbenzene or (XIX), and a chain-limiting agent which is, in this second process, a monoacetylene (XX) similar to that already described above for the first process.

Compound (XVIII) or (XIX), as a mixture with the chain-limiting agent, reacts with a dihydrosilane of formula (XXIa) to (XXIc).

The basic metal oxide used is preferably chosen from oxides of alkali metals or of alkaline-earth metals, lanthanide oxides and scandium, yttrium, thorium, titanium, zirconium, hafnium, copper, zinc and cadmium oxides, and mixtures thereof.

Examples of such oxides are given in document EP-1-0 617 073 on pages 16 and 17, to which reference is explicitly made herein. These oxides may be subjected to an activation treatment as described in patent EP-B1-0 617 073.

The cured products prepared by heat-treating the polymers according to the invention are, for example, produced by melting this polymer or by dissolving it in a suitable solvent, and then by optionally placing it in the desired form and heating it in a gaseous atmosphere of air, of nitrogen or of an inert gas such as argon or helium.

The treatment temperature generally ranges from 50 to 700° C., preferably from 100 to 400° C. and more preferably from 150 to 350° C., and the heating is generally performed for a period of from one minute to 100 hours.

The curing reaction may optionally be performed in the presence of a curing agent and the polymer according to the invention may also be mixed with other resins or polymers.

On account of the similar structure of the polymers according to the invention and of the polymers of document EP-B1-0 617 073, their curing process is substantially identical and reference may be made to page 17 of said document for further details.

The preparation of composites with an organic matrix comprising the polymer of the invention may be performed via numerous techniques. Each user adapts it to his constraints. The principle is generally always the same: i.e. coating of a textile reinforcer with the resin, followed by crosslinking via heat treatment comprising a rate of temperature increase of a few degrees/minute, followed by a steady temperature close to the crosslinking temperature.

The invention will now be described with reference to the following examples, which are given as non-limiting illustrations.

EXAMPLE 1

Preparation of Poly(Dimethyldisiloxene Ethynylene Phenylene Ethynylene): Polymer of Formula (I)

24.2 g (211 mmol) of bromoethane dissolved in 100 ml of anhydrous THF are added dropwise, so as to maintain reflux, into a 1 litre three-necked round-bottomed flask placed under argon, and having 6 g (247 mmol) of magnesium powder suspended in 100 ml of anhydrous THF. Refluxing is maintained for one hour after the end of the addition. 13.3 g (105.5 mmol) of 1,3-diethynylbenzene dissolved in 100 ml of anhydrous THF are then added dropwise and left stirring at reflux for one hour.

21.4 g (105.5 mmol) of 1,3-dichlorotetramethyldisiloxane dissolved in 100 ml of anhydrous THF are then added dropwise under reflux. The solution is then stirred at reflux for one hour. 26.8 g (247 mmol) of trimethylchlorosilane are then added and the mixture is refluxed for 30 minutes. The polymer thus formed is then hydrolysed by adding 50 ml of hydrochloric acid at a concentration of 35% by mass dissolved in 100 ml of water. The reaction medium is separated into two fractions, an aqueous fraction and an organic fraction. The aqueous phase is then subjected to a change of solvent, the THF being replaced with 200 ml of chloroform. The polymer dissolved in the chloroform is then washed three times with 100 ml of water. The organic solution is then dehydrated by passing it through a bed of magnesium sulphate. The polymer is then obtained by evaporating off the solvent. The polymer is finally purified by drying under 0.4 mbar at 20° C. 22 g (80% yield) of polymer are thus obtained, in the form of a yellow oil.

The number-average mass of this compound is 962 for a mass-average mass of 1535 (polydispersity ot 1.6). These masses were determined by GPC via calibration with polystyrene.

EXAMPLE 2

Preparation of Poly(Tetramethyldisilylene Ethynylene Phenylene Ethynylene): Polymer of Formula (II)

The synthetic conditions are identical to those of Example 1, except for the amounts of silyl compounds. Thus, 19.75 g (105.5 mmol) of 1,2-dichlorotetramethyl-disilane are introduced. 20 g (80% yield) of polymer are thus obtained, in the form of a yellow oil.

The number-average molecular mass of this compound is 1343 for a mass-average mass of 2855 (polydispersity of 2.15). These masses were determined by GPC via calibration with polystyrene.

The viscosity of this polymer is 600 mPa.s at 100° C. and 160 mPa.s at 120° C. and 100 mPa.s at 140° C.

EXAMPLE 3

Preparation of Poly(Tetramethyldisiloxene Ethynylene Phenylene Ethynylene-co-methyl Silylene Ethynylene Phenylene Ethynylene): Polymer of Formula (Ia) with: $-x_1=0$ and $x_2=x_1$, $x_2=0$ and $n_1=1$ 24.2 g (211 mmol) of bromoethane dissolved in 100 ml of anhydrous THF are introduced dropwise, so as to maintain reflux, into a 1 litre three-necked round-bottomed flask placed under argon, and having 6 g (247 mmol) of magnesium powder suspended in 100 ml of anhydrous THF. Refluxing is maintained for one hour after the end of the addition. 13.3 g (105.5 mmol) of 1,3-diethynylbenzene dissolved in 100 ml of anhydrous THF are then added dropwise and left stirring at reflux for one hour.

A mixture of 10.7 g (52.75 mmol) of 1,3-dichlorotetramethyldisiloxane and 6.07 g (52.75 mmol) of methyldichlorosilane dissolved in 100 ml of anhydrous THF are then added dropwise at reflux. The solution is then left stirring at reflux for one hour. 26.9 g (247 mmol) of trimethylchlorosilane are then added and the mixture is refluxed for 30 minutes. The polymer thus formed is then hydrolysed by adding 50 ml of hydrochloric acid at a concentration of 35% by mass dissolved in 100 ml of water. The reaction medium is separated into two fractions, an aqueous fraction and an organic fraction. The aqueous fraction is then subjected to a change of solvent, the THF being replaced with 200 ml of chloroform. The polymer dissolved in chloroform is then washed three times with 100 ml of water. The organic solution is then dehydrated by passage through a bed of magnesium sulphate. The polymer is then obtained by evaporating off the solvent. The polymer is finally purified by drying under 0.4 mbar at 20° C. 20 g (80% yield) of polymer are thus obtained, in the form of a yellow oil.

The number-average molecular mass of this compound is 1065 for a mass-average mass of 1705 (polydispersity of 1.6). These masses were determined by GPC via calibration with polystyrene.

References

[1] "New Highly Heat-Resistant Polymers having Silicon: Poly(silyleneethynylenephenylene ethynylene)s" by ITOH M., INOUE K., IWATA K., MITSUZUKA M. and KAKIGANO T., Macromolecules, 1997, 30, pp. 694–701.

[2] CORRIU Robert J. P. et al., Journal of polymer science: Part C: Polymer Letters, 1990, 28, pp. 431–437.

[3] "Copper [1] chloride catalyzed cross dehydrocoupling reactions between silanes and ethynyl compounds. A new method for the copolymerization of silanes and alkynes" by Liu H. Q.; HARROD J. F. The Canadian Journal of Chemistry, 1990, vol. 68, pp. 1100–1105.

[4] "A novel synthesis and extremely high Thermal stability of Poly[(phenylsilylene)-(ethynylene-1,3-phenylene ethynylene)]" by ITOH M., INOUE K., IWATA K., MITSUZUKA M., KAKIGANO T.; Macromolecules, 1994, 27, pp. 7917–7919.

[5] KUROKI S.; OKITA K.; KAKIGANO T.; ISHIKAMA J.; ITOH M.; Macromolecules, 1998, 31, 2 804-2 808.

What is claimed is:

1. Poly(ethylene phenylene ethynylene silylene) polymer, in which said polymer comprises at least one repeating unit comprising two acethlenic bonds, at least one silicon atom, and at least one inert spacer group; said polymer also comprising, at the end of the chain, groups (Y) derived from a chain-limiting agent wherein said spacer group(s) is (are) selected from the group consisting of aromatic nuclei linked via at least one covalent bond and/or at least one divalent group, polysiloxane groups, polysilane groups and any possible combination of two or more of these groups.

2. Polymer according to claim 1, comprising a repeating unit of formula (I):

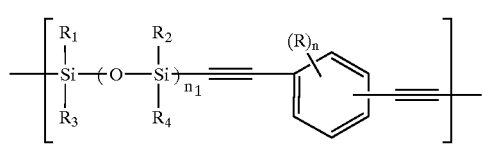

in which the phenylene group of the central repeating unit may be in the o, m or p form; R represents a halogen atom an alkyl group (linear or branched) having from 1 to 20 carbon atoms, a cycloalkyl group having from 3 to 20 carbon atoms, an alkoxy group having from 1 to 20 carbon atoms, an aryl group having from 6 to 20 carbon atoms, an aryloxy group having from 6 to 20 carbon atoms, an alkenyl group (linear or branched) having from 2 to 20 carbon atoms, a cycloalkenyl group having from 3 to 20 carbon atoms, an alkynyl group having from 2 to 20 carbon atoms, an amino group, an amino group substituted with one or two substituents having from 1 to 20 carbon atoms or a silanyl group having from 1 to 10 silicon atoms, one or more hydrogen atoms linked to the carbon atoms of R, may be replaced with halogen atoms, alkyl groups, alkoxy groups, aryl groups, aryloxy groups, amino groups, amino groups substituted with one or two substituents or silanyl groups; $R_1$, $R_2$, $R_3$ and $R_4$, which may be identical or different, represent a hydrogen atom; an alkyl group having from 1 to 20 carbon atoms, a cycloalkyl group having from 3 to 20 carbon atoms, an alkoxy group having from 1 to 20 carbon atoms, an aryl group having from 6 to 20 carbon atoms, an aryloxy group having from 6 to 20 carbon atoms, an alkenyl group having from 2 to 20 carbon atoms, a cycloalkenyl group having from 3 to 20 carbon atoms, an alkynyl group having from 2 to 20 carbon atoms, one or more of the hydrogen atoms linked to the carbon atoms of $R_1$, $R_2$, $R_3$ and $R_4$ optionally replaced with halogen atoms, alkyl groups, alkoxy groups, aryl groups, aryloxy groups, amino groups, disubstituted amino groups or silanyl groups; n is an integer from 1 to 4, and $n_1$ is an integer from 1 to 10.

3. Polymer according to claim 1, comprising a repeating unit of formula (II):

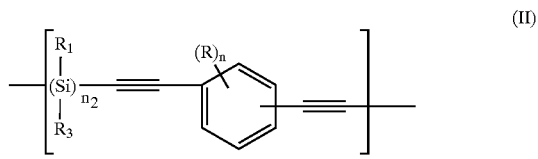

in which the phenylene group may be in the o, m or p form; R represents a halogen atom, an alkyl group (linear or branched) having from 1 to 20 carbon atoms, a cycloalkyl group having from 3 to 20 carbon atoms, an alkoxy group having from 1 to 20 carbon atoms, an aryl group having from 6 to 20 carbon atoms, an aryloxy group having from 6 to 20 carbon atoms, an alkenyl group (linear or branched) having from 2 to 20 carbon atoms, a cycloalkenyl group having from 3 to 20 carbon atoms, an alkynyl group having from 2 to 20 carbon atoms, an amino group, an amino group substituted with one or two substituents having from 1 to 20 carbon atoms or a silanyl group having from 1 to 10 silicon atoms, one or more hydrogen atoms linked to the carbon atoms of R, may be replaced with halogen atoms, alkyl groups, alkoxy groups, aryl groups, aryloxy groups, amino groups, amino groups substituted with one or two substituents or silanyl groups; $R_1$ and $R_3$, which may be identical or different, represent a hydrogen atom; an alkyl group having from 1 to 20 carbon atoms, a cycloalkyl group having from 3 to 20 carbon atoms, an alkoxy group having from 1 to 20 carbon atoms, an aryl group having from 6 to 20 carbon atoms, an aryloxy group having from 6 to 20 carbon atoms, an alkenyl group having from 2 to 20 carbon atoms, a cycloalkenyl group having from 3 to 20 carbon atoms, an alkynyl group having from 2 to 20 carbon atoms, one or more of the hydrogen atoms linked to the carbon atoms of $R_1$ and $R_3$ optionally replaced with halogen atoms, alkyl groups, alkoxy groups, aryl groups, aryloxy groups, amino groups, disubstituted amino groups or silanyl groups; n is an integer from 1 to 4; and $n_2$ is an integer from 2 to 10.

4. Polymer according to claim 1, comprising a repeating unit of formula (III):

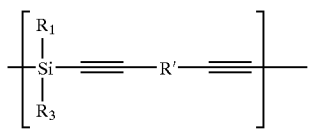

(III)

in which $R_1$ and $R_3$, which may be identical or different, represent a hydrogen atom; an alkyl group having from 1 to 20 carbon atoms, a cycloalkyl group having from 3 to 20 carbon atoms, an alkoxy group having from 1 to 20 carbon atoms, an aryl group having from 6 to 20 carbon atoms, an aryloxy group having from 6 to 20 carbon atoms, an alkenyl group having from 2 to 20 carbon atoms, a cycloalkenyl group having from 3 to 20 carbon atoms, an alkynyl group having from 2 to 20 carbon atoms, one or more of the hydrogen atoms linked to the carbon atoms of $R_1$ and $R_3$ optionally replaced with halogen atoms, alkyl groups, alkoxy groups, aryl groups, aryloxy groups, amino groups, disubstituted amino groups or silanyl groups; and R' represents a group comprising at least two aromatic nuclei comprising from 6 to 20 carbon atoms, linked via at least one covalent bond and/or at least one divalent group.

5. Polymer according to claim 1, comprising a repeating unit of formula (IV):

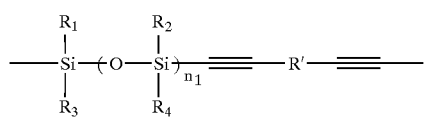

(IV)

in which $R_1$, $R_2$, $R_3$, and $R_4$, which may be identical or different, represent a hydrogen atom; an alkyl group having from 1 to 20 carbon atoms, a cycloalkyl group having from 3 to 20 carbon atoms, an alkoxy group having from 1 to 20 carbon atoms, an aryl group having from 6 to 20 carbon atoms, an aryloxy group having from 6 to 20 carbon atoms, an alkenyl group having from 2 to 20 carbon atoms, a cycloalkenyl group having from 3 to 20 carbon atoms, an alkynyl group having from 2 to 20 carbon atoms, one or more of the hydrogen atoms linked to the carbon atoms of $R_1$, $R_2$, $R_3$ and $R_4$ optionally replaced with halogen atoms, alkyl groups, alkoxy groups, aryl groups, aryloxy groups, amino groups, disubstituted amino groups or silanyl groups; and $n_1$ is an integer from 1 to 10; and R' represents a group comprising at least two aromatic nuclei comprising from 6 to 20 carbon atoms, linked via at least one covalent bond and/or at least one divalent group.

6. Polymer according to claim 1, comprising a repeating unit of formula (V):

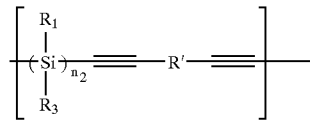

(V)

in which $R_1$ and $R_3$ which may be identical or different, represent a hydrogen atom; an alkyl group having from 1 to 20 carbon atoms, a cycloalkyl group having from 3 to 20 carbon atoms, an alkoxy group having from 1 to 20 carbon atoms, an aryl group having from 6 to 20 carbon atoms, an aryloxy group having from 6 to 20 carbon atoms, an alkenyl group having from 2 to 20 carbon atoms, a cycloalkenyl group having from 3 to 20 carbon atoms, an alkynyl group having from 2 to 20 carbon atoms, one or more of the hydrogen atoms linked to the carbon atoms of $R_1$ and $R_3$ optionally replaced with halogen atoms, alkyl groups, alkoxy groups, aryl groups, aryloxy groups, amino groups, disubstituted amino groups or silanyl groups; R' represents a group comprising at least two aromatic nuclei comprising from 6 to 20 carbon atoms, linked via at least one covalent bond and for at least one divalent group and $n_2$ is an integer from 2 to 10.

7. Polymer according to claim 4, in which R' is selected from the group consisting of the following groups:

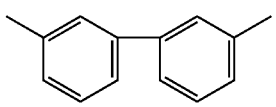

(VI)

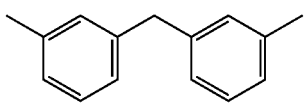

(VII)

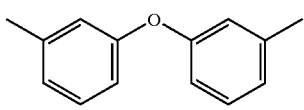

(VIII)

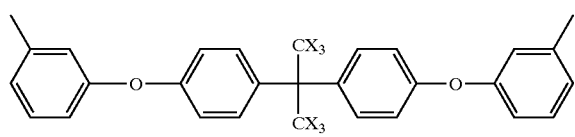

(X)

in which X represents a hydrogen atom or a halogen atom.

8. Polymer according to claim 1, in which the repeating unit is repeated $n_3$ times, with $n_3$ being an integer from 2 to 100.

9. Polymer according to claim 1, comprising several different repeating units comprising at least one inert spacer group.

10. Polymer according to claim 9, in which said repeating units comprising at least one inert spacer group selected from the group consisting of the repeating units of: formulae (I)

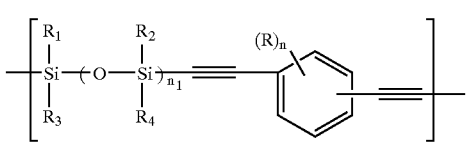

(I)

in which the phenylene group of the central repeating unit may be in the o, m or p form; R represents a halogen atom, an alkyl group (linear or branched) having from 1 to 20 carbon atoms, a cycloalkyl group having from 3 to 20 carbon atoms, an alkoxy group having from 1 to 20 carbon atoms, an aryl group having from 6 to 20 carbon atoms, an aryloxy group having from 6 to 20 carbon atoms, an alkenyl group (linear or branched) having from 2 to 20 carbon atoms, a cycloalkenyl group having from 3 to 20 carbon atoms, an alkynyl group having from 2 to 20 carbon atoms, an amino group, an amino group substituted with one or two substituents having from 1 to 20 carbon atoms or a silanyl group having from 1 to 10 silicon atoms, one or more hydrogen atoms linked to the carbon atoms of R, may be replaced with halogen atoms, aryl groups, aryloxy groups, amino groups, amino groups substituted with one or two substituents or silanyl. groups; $R_1$, $R_2$, $R_3$ and $R_4$, which may be identical or different, represent a hydrogen atom; an alkyl group having from 1 to 20 carbon atoms, a cycloalkyl group having from 3 to 20 carbon atoms, an alkoxy group having from 1 to 20 carbon atoms, an aryl group having from 6 to 20 carbon atoms, an aryloxy group having from 6 to 20 carbon atoms, an alkenyl group having from 2 to 20 carbon atoms, a cycloalkenyl group having from 3 to 20 carbon atoms, an alkynyl group having from 2 to 20 carbon atoms, one or more of the hydrogen atoms linked to the carbon atoms of $R_1$, $R_2$, $R_3$ and $R_4$ optionally replaced with halogen atoms, alkyl groups, alkoxy groups, aryl groups, aryloxy groups, amino groups, disubstituted amino groups or silanyl groups; n is an integer from 1 to 4, and $n_1$ is an integer from 1 to 10; formula (II)

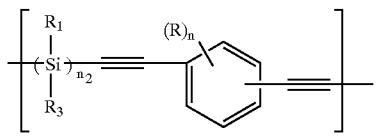

(II)

in which the phenylene group may be in the o, m or p form; R represents a halogen atom, an alkyl group (linear or branched) having from 1 to 20 carbon atoms, a cycloalkyl group having from 3 to 20 carbon atoms, an alkoxy group having from 1 to 20 carbon atoms, an aryl group having from 6 to 20 carbon atoms, an aryloxy group having from 6 to 20 carbon atoms, an alkenyl group (linear or branched) having from 2 to 20 carbon atoms, a cycloalkenyl group having from 3 to 20 carbon atoms, an alkynyl group having from 2 to 20 carbon atoms, an amino group, an amino group substituted with one or two substituents having from 1 to 20 carbon atoms or a silanyl group having from 1 to 10 silicon atoms, one or more hydrogen atoms linked to the carbon atoms of R, may be replaced with halogen atoms, alkyl groups, alkoxy groups, aryl groups, aryloxy groups, amino groups, amino groups substituted with one or two substituents or silanyl groups; $R_1$ and $R_3$, which may be identical or different, represent a hydrogen atom; an alkyl group having from 1 to 20 carbon atoms, a cycloalkyl group having from 3 to 20 carbon atoms, an alkoxy group having from 1 to 20 carbon atoms, an aryl group having from 6 to 20 carbon atoms, an aryloxy group having from 6 to 20 carbon atoms, an alkenyl group having from 2 to 20 carbon atoms, a cycloalkenyl group having from 3 to 20 carbon atoms, an alkynyl group having from 2 to 20 carbon atoms, one or more of the hydrogen atoms linked to the carbon atoms of $R_1$ and $R_3$ optionally being replaced with halogen atoms, alkyl groups, alkoxy groups, aryl groups, aryloxy groups, amino groups, disubstituted amino groups or silanyl groups; formula (III),

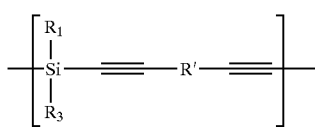

(III)

in which $R_1$ and $R_3$ which may be identical or different, represent a hydrogen atom; an alkyl group having from 1 to 20 carbon atoms, a cycloalkyl group having from 3 to 20 carbon atoms, an alkoxy group having from 1 to 20 carbon atoms, an aryl group having from 6 to 20 carbon atoms, an aryloxy group having from 6 to 20 carbon atoms, an alkenyl group having from 2 to 20 carbon atoms, a cycloalkenyl group having from 3 to 20 carbon atoms, an alkynyl group having from 2 to 20 carbon atoms, one or more of the hydrogen atoms linked to the carbon atoms of $R_1$ and $R_3$ optionally replaced with halbgen atoms, alkyl groups, alkoxy groups, aryl groups, aryloxy groups, amino groups, disubstituted amino groups or silanyl groups; and R' represents a group comprising at least two aromatic nuclei comprising from 6 to 20 carbon atoms, linked via at least one covalent bond and/or at least one divalent group; formula (IV)

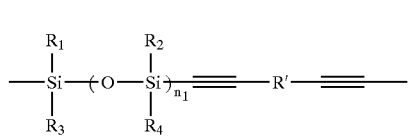

(IV)

in which $R_1$, $R_2$, $R_3$, and $R_4$, which may be identical or different, represent a hydrogen atom; an alkyl group having from 1 to 20 carbon atoms, a cycloalkyl group having from 3 to 20 carbon atoms, an alkoxy group having from 1 to 20 carbon atoms, an aryl group having from 6 to 20 carbon atoms, an aryloxy group having from 6 to 20 carbon atoms, an alkenyl group having from 2 to 20 carbon atoms, a cycloalkenyl group having from 3 to 20 carbon atoms, an alkynyl group having from 2 to 20 carbon atoms, one or more of the hydrogen atoms linked to the carbon atoms of $R_1$, $R_2$, $R_3$ and $R_4$ optionally replaced with halogen atoms, alkyl groups, alkoxy groups, aryl groups, aryloxy groups, amino groups, disubstituted amino groups or silanyl groups; and $n_1$ is an integer from 1 to 10; and R' represents a group comprising at least two aromatic nuclei comprising from 6 to 20 carbon atoms, linked via at least one covalent bond and/or at least one divalent group; and formula (V)

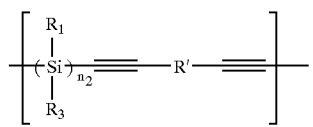

(V)

in which $R_1$ and $R_3$, which may be identical or different, represent a hydrogen atom; an alkyl group having from 1 to 20 carbon atoms, a cycloalkyl group having from 3 to 20 carbon atoms, an alkoxy group having from 1 to 20 carbon atoms, an aryl group having from 6 to 20 carbon atoms, an aryloxy group having from 6 to 20 carbon atoms, an alkenyl group having from 2 to 20 carbon atoms, a cycloalkenyl group having from 3 to 20 carbon atoms, an alkynyl group having from 2 to 20 carbon atoms, one or more of the hydrogen atoms linked to the carbon atoms of $R_1$ and $R_3$ optionally being replaced with halogen atoms, alkyl groups, alkoxy groups, aryl groups, aryloxy groups, amino groups, disubstituted amino groups or silanyl groups; R' represents a group comprising at least two aromatic nuclei comprising from 6 to 20 carbon atoms, linked via at least one covalent bond and/or at least one divalent group, and $n_2$ is an integer from 2 to 10.

11. Polymer according to claim 10, in which said repeating units are repeated $x_1$, $x_2$, $x_3$, $x_4$ and $x_5$ times, respectively, $x_1$, $x_2$, $x_3$, $x_4$ and $x_5$ representing integers from 0 to 100 000, with the proviso that at least two from among $x_1$, $x_2$, $x_3$, $x_4$ and $x_5$ are other than 0.

12. Polymer according to claim 1, further comprising one or more repeating units not comprising an inert spacer group.

13. Polymer according to claim 12, in which said repeating unit not comprising an inert spacer group corresponds to the formula:

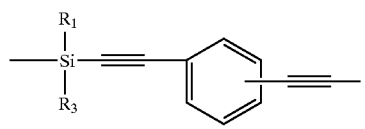

(Va)

14. Polymer according to claim 12, in which said repeating unit not comprising an inert spacer group is repeated $x_6$ times, $x_6$ representing an integer up to 100 000.

15. Polymer according to claim 11, corresponding to the formula:

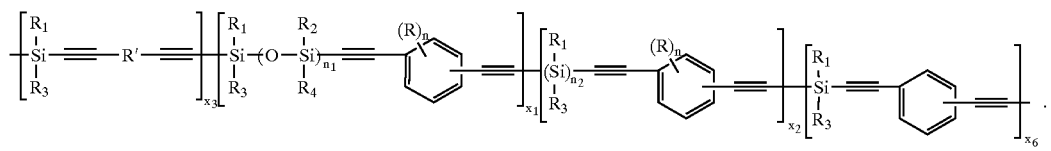

(Ia)

16. Polymer according to claim 1, the number-average molecular mass of which is from 400 to 1 000 000 and the weight-average molecular mass of which is from 500 to 1000 000.

17. Polymer according to claim 1, in which the group (Y), derived from a chain-limiting agent, corresponds to the formula:

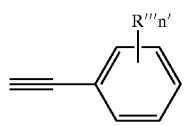

(XI)

in which R'" represents a halogen atom, an alkyl group (linear or branched) having from 1 to 20 carbon atoms, a cycloalkyl group having from 3 to 20 carbon atoms, an alkoxy group having from 1 to 20 carbon atoms, an aryl group having from 6 to 20 carbon atoms, an aryloxy group having from 6 to 20 carbon atoms, an alkenyl group (linear or branched) having from 2 to 20 carbon atoms, a cycloalkenyl group having from 3 to 20 carbon atoms, an alkynyl group having from 2 to 20 carbon atoms, an amino group, an amino group substituted with one or two substituents having from 1 to 20 carbon atoms or a silanyl group having from 1 to 10 silicon atoms, one or more hydrogen atoms linked to the carbon atoms of R'", may be replaced with halogen atoms, alkyl groups, alkoxy groups, aryl groups, aryloxy groups, amino groups, amino groups substituted with one or two substituents or silanyl groups; and n' is an integer from 1 to 4.

18. Polymer according to claim 1, in which the group (Y), derived from a chain-limiting agent, corresponds to the formula:

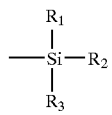

(XII)

in which $R_1$, $R_2$ and $R_3$, which may be identical or different, represent a hydrogen atom; an alkyl group having from 1 to 20 carbon atoms, a cycloalkyl group having from 3 to 20 carbon atoms, an alkoxy group having from 1 to 20 carbon atoms, an aryl group having from 6 to 20 carbon atoms, an aryloxy group having from 6 to 20 carbon atoms, an alkenyl group having from 2 to 20 carbon atoms, a cycloalkenyl group having from 3 to 20 carbon atoms, an alkynyl group having from 2 to 20 carbon atoms, one or more of the hydrogen atoms linked to the carbon atoms of $R_1$, $R_2$ and $R_3$ optionally replaced with halogen atoms, alkyl groups, alkoxy groups, aryl groups, aryloxy groups, amino groups, disubstituted amino groups or silanyl groups.

19. Polymer according to claim 16, in which the molar ratio of the groups (Y) at the end of the chain to the repeating units of ethynylene phenylene ethynylene silylene type is from 0.01 to 1.5 and preferably from 0.25 to 1.

20. Polymer according to claim 16, in which the molar proportion of the groups (Y) at the end of the chain is from 1% to 60% and preferably from 20% to 50%.

21. Polymer according to claim 16, having a number-average molecular mass of 400 to 5000.

22. Polymer according to claim 16, having a weight-average molecular mass of 600 to 10000.

23. Polymer according to claim 16, having a viscosity of 0.1 to 1000 mPa.s.

24. Polymer according to claim 16, having a glass transition temperature Tg of −150 to +10° C.

25. Process for preparing a polymer of poly(ethynylene phenylene ethynylene silylene) type, of determined molecular mass, bearing at the end of the chain groups derived from a chain-limiting agent, said polymer corresponding to repeating units comprising at least one inert spacer group selected from the group consisting of the repeating units of: formulae (I)

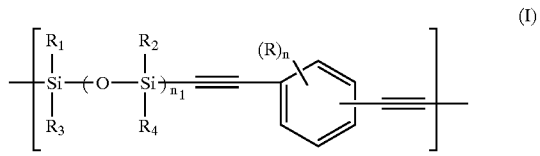

(I)

in which the phenylene group of the central repeating unit may be in the o, m or p form; R represents a halogen atom, an alkyl group (linear or branched) having from 1 to 20 carbon atoms, a cycloalkyl group having from 3 to 20 carbon atoms, an alkoxy group having from 1 to 20 carbon atoms, an aryl group having from 6 to 20 carbon atoms, an aryloxy group having from 6 to 20 carbon atoms, an alkenyl group (linear or branched) having from 2 to 20 carbon atoms, a cycloalkenyl group having from 3 to 20 carbon atoms, an alkynyl group having from 2 to 20 carbon atoms, an amino group, an amino group substituted with one or two substituents having from 1 to 20 carbon atoms or a silanyl group having from 1 to 10 silicon atoms, one or more hydrogen atoms linked to the carbon atoms of R, may be replaced with halogen atoms, alkyl groups, alkoxy groups, amino groups, amino groups substituted with one or two substituents or silanyl groups; $R_1$, $R_2$, $R_3$ and $R_4$, which may be identical or different, represent a hydrogen atom; an alkyl group having from 1 to 20 carbon atoms, a cycloalkyl group having from 3 to 20 carbon atoms, an alkoxy group having from 1 to 20 carbon atoms, an aryl group having from 6 to 20 carbon atoms, an aryloxy group having from 6 to 20 carbon atoms, an alkenyl group having from 2 to 20 carbon atoms, a cycloalkenyl group having from 3 to 20 carbon atoms, an alkynyl group having from 2 to 20 carbon atoms, one or more of the hydrogen atoms linked to the carbon atoms of $R_1$, $R_2$, $R_3$ and $R_4$ optionally with halogen atoms, alkyl groups, alkoxy groups, aryl groups, aryloxy groups, amino groups, disubstituted amino groups or silanyl groups; n is an integer from 1 to 4, and $n_1$ is an integer from 1 to;

formula (II)

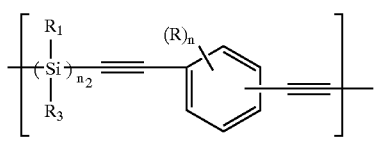

(II)

in which the phenylene group may be in the o, m or p form; R represents a halogen atom, an alkyl group (linear or branched) having from 1 to 20 carbon atoms, a cycloalkyl group having from 3 to 20 carbon atoms, an alkoxy group having from 1 to 20 carbon atoms, an aryl group having from 6 to 20 carbon atoms, an aryloxy group having from 6 to 20 carbon atoms, an alkenyl group (linear or branched) having from 2 to 20 carbon atoms, a cycloalkenyl group having from 3 to 20 carbon atoms, an alkynyl group having from 2 to 20 carbon atoms, an amino group, an amino group substituted with one or two substituents having from 1 to 20 carbon atoms or a silanyl group having from 1 to 10 silicon atoms, one or more hydrogen atoms linked to the carbon atoms of R, may be replaced with halogen atoms, alkyl groups, alkoxy groups, aryl groups, arytoxy groups, amino groups, amino groups substituted with one or two substituents or silanyl groups; $R_1$ and $R_3$, which may be identical or different, represent a hydrogen atom; an alkyl group having from 1 to 20 carbon atoms, a cycloalkyl group having from 3 to 20 carbon atoms, an alkoxy group having from 1 to 20 carbon atoms, an aryl group having from 6 to 20 carbon atoms, an aryloxy group having from 6 to 20 carbon atoms, an alkenyl group having from 2 to 20 carbon atoms, a cycloalkenyl group having from 3 to 20 carbon atoms, an alkynyl group having from 2 to 20 carbon atoms, one or more of the hydrogen atoms linked to the carbon atoms of $R_1$ and $R_3$ optionally replaced with halogen atoms, alkyl groups, alkoxy groups, aryl groups, aryloxy groups, amino groups, disubstituted amino groups or silanyl groups:

formula (III)

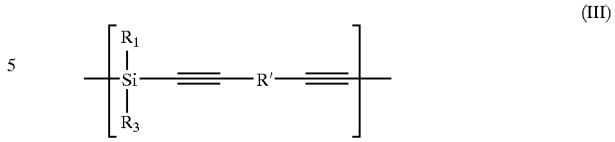

(III)

in which $R_1$ and $R_3$ which may be identical or different, represent a hydrogen atom; an alkyl group having from 1 to 20 carbon atoms, a cycloalkyl group having from 3 to 20 carbon atoms, an alkoxy group having from 1 to 20 carbon atoms, an aryl group having from 6 to 20 carbon atoms, an aryloxy group having from 6 to 20 carbon atoms, an alkenyl group having from 2 to 20 carbon atoms, a cycloalkenyl group having from 3 to 20 carbon atoms, an alkynyl group having from 2 to 20 carbon atoms, one or more of the hydrogen atoms linked to the carbon atoms of $R_1$ and $R_3$ optionally replaced with halogen atoms, alkyl groups, alkoxy groups, aryl groups, aryloxy groups, amino groups, disubstituted amino groups or silanyl groups; and R' represents a group comprising at least two aromatic nuclei comprising from 6 to 20 carbon atoms, linked via at least one covalent bond and/or at least one divalent group;

formula (IV)

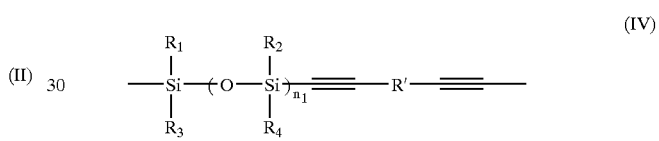

(IV)

in which $R_1$, $R_2$, $R_3$, and $R_4$, which may be identical or different, represent a hydrogen atom; an alkyl group having from 1 to 20 carbon atoms, a cycloalkyl group having from 3 to 20 carbon atoms, an alkoxy group having from 1 to 20 carbon atoms, an aryl group having from 6 to 20 carbon atoms, an aryloxy group having from 6 to 20 carbon atoms, an alkenyl group having from 2 to 20 carbon atoms, a cycloalkenyl group having from 3 to 20 carbon atoms, an alkynyl group having from 2 to 20 carbon atoms, one or more of the hydrogen atoms linked to the carbon atoms of $R_1$, $R_2$, $R_3$ and $R_4$ optionally replaced with halogen atoms, alkyl groups, alkoxy groups, aryl groups, aryloxy groups, amino groups, disubstituted amino groups or silanyl groups; and $n_1$ is an integer from 1 to 10; and R' represents a group comprising at least two aromatic nuclei comprising from 6 to 20 carbon atoms, linked via at least one covalent bond and/or at least one divalent group; and formula (V)

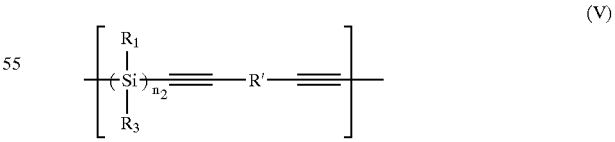

(V)

in which $R_1$ and $R_3$, which may be identical or different, represent a hydrogen atom; an alkyl group having from 1 to 20 carbon atoms, a cycloalkyl group having from 3 to 20 carbon atoms, an alkoxy group having from 1 to 20 carbon atoms, an aryl group having from 6 to 20 carbon atoms, an aryloxy group having from 6 to 20 carbon atoms, an alkenyl group having from 2 to 20 carbon atoms, a cycloalkenyl group having from 3 to 20 carbon atoms, an alkynyl group having from 2 to 20 carbon atoms, one or more of the hydrogen atoms linked to the carbon atoms of $R_1$ and $R_3$ optionally replaced with halogen atoms, alkyl groups, alkoxy groups, aryl groups, aryloxy groups, amino groups, disubstituted amino groups or silanyl groups; R' represents a group comprising at least two aromatic nuclei comprising from 6 to 20 carbon atoms, linked via at least one covalent bond and/or at least one divalent group respectively, said process comprising the reaction of a Grignard reagent of general formula:

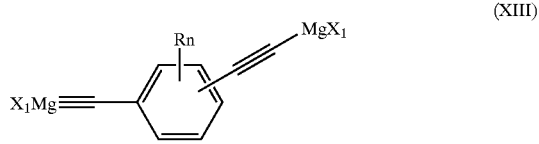
(XIII)

or of general formula:

(XIV)

in which the phenylene group (formula (XIII)) may be in the o, m or p form, and R, R' and n have the meaning already given above and $X_1$ represents a halogen atom as a mixture with a chain-limiting agent:

$$Y\text{-}MgX_1 \quad (XV)$$

$X_1$ having the meaning already given above, and Y is a group chosen from the groups of formula:

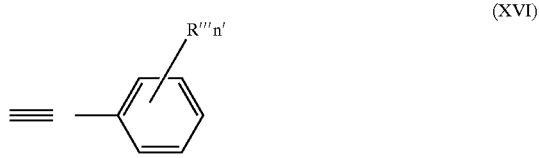
(XVI)

in which R''' has the same meaning as R and may be identical to or different from the latter, and n' has the same meaning as n and may be identical to or different from the latter, with a dihalide (dihalosilane) of formula:

(XVIIa)
(XVIIb)
(XVIIc)

in which $R_1$, $R_2$, $R_3$ and $R_4$, which may be identical or different, and $n_1$ and $n_2$ have the meaning already given above, and $X_1$ has the meaning already given above, $X_1$ preferably being Cl, in the presence of an aprotic solvent, followed by a hydrolysis step to give the final polymer of formula (I), (II), (III), (IV) or (V), respectively.

26. Process for preparing a polymer of poly(ethynylene phenylene ethynylene silylene) type, of determined molecular mass, bearing at the end of the chain groups derived from a chain-limiting agent, said polymer corresponding to repeating units comprising at least one inert spacer group selected from the group consisting of the repeating units of: formulae (I)

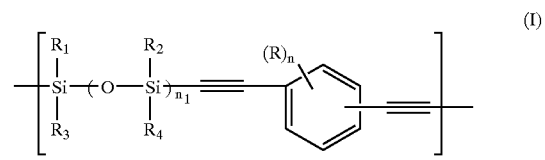
(I)

in which the phenylene group of the central repeating unit may be in the o, m or p form; R represents a halogen atom, an alkyl group (linear or branched) having from 1 to 20 carbon atoms, a cycloalkyl group having from 3 to 20 carbon atoms, an alkoxy group having from 1 to 20 carbon atoms, an aryl group having from 6 to 20 carbon atoms, an aryloxy group having from 6 to 20 carbon atoms, an alkenyl group (linear or branched) having from 2 to 20 carbon atoms, a cycloalkenyl group having from 3 to 20 carbon atoms, an alkynyl group having from 2 to 20 carbon atoms, an amino group, an amino group substituted with one or two substituents having from 1 to 20 carbon atoms or a silanyl group having from 1 to 10 silicon atoms, one or more hydrogen atoms linked to the carbon atoms of R, may be replaced with halogen atoms, aryl groups, aryloxy groups, amino groups, amino groups substituted with one or two substituents or silanyl groups; $R_1$, $R_2$, $R_3$ and $R_4$, which may be identical or different, represent a hydrogen atom; an alkyl group having from 1 to 20 carbon atoms, a cycloalkyl group having from 3 to 20 carbon atoms, an alkoxy group having from 1 to 20 carbon atoms, an aryl group having from 6 to 20 carbon atoms, an aryloxy group having from 6 to 20 carbon atoms, an alkenyl group having from 2 to 20 carbon atoms, a cycloalkenyl group having from 3 to 20 carbon atoms, an alkynyl group having from 2 to 20 carbon atoms, one or more of the hydrogen atoms linked to the carbon atoms of $R_1$, $R_2$, $R_3$ and $R_4$ optionally replaced with halogen atoms, alkyl groups, alkoxy groups, aryl groups, aryloxy groups, amino groups, disubstituted amino groups or silanyl groups; n is an integer from 1 to 4, and $n_1$ is an integer from 1 to 10; formula (II)

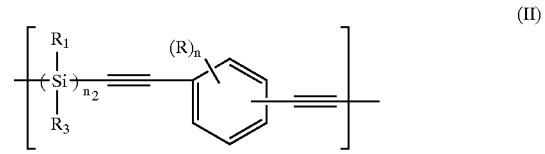
(II)

in which the phenylene group may be in the o, m or p form; R represents a halogen atom, an alkyl group (linear or branched) having from 1 to 20 carbon atoms, a cycloalkyl group having from 3 to 20 carbon atoms, an alkoxy group having from 1 to 20 carbon atoms, an aryl group having from 6 to 20 carbon atoms, an aryloxy group having from 6 to 20 carbon atoms, an alkenyl group (linear or branched) having from 2 to 20 carbon atoms, a cycloalkenyl group having from 3 to 20 carbon atoms), an alkynyl group having from 2 to 20 carbon atoms, an amino group, an amino group substituted with one or two substituents having from 1 to 20 carbon atoms or a silanyl group having from 1 to 10 silicon atoms, one or more hydrogen atoms linked to the carbon atoms of R, may be replaced with halogen atoms, alkyl groups, alkoxy groups, aryl groups, aryloxy groups, amino groups, amino groups substituted with one or two substituents or silanyl groups; $R_1$ and $R_3$, which may be identical or different, represent a hydrogen atom; an alkyl group having from 1 to 20 carbon atoms, a cycloalkyl group having from 3 to 20 carbon atoms, an alkoxy group having from 1 to 20 carbon atoms, an aryl group having from 6 to 20 carbon atoms, an aryloxy group having from 6 to 20 carbon atoms, an alkenyl group having from 2 to 20 carbon atoms, a cycloalkenyl group having from 3 to 20 carbon atoms, an alkynyl group having from 2 to 20 carbon atoms, one or more of the hydrogen atoms linked to the carbon atoms of $R_1$ and $R_3$ optionally replaced with halogen atoms, alkyl groups, alkoxy groups, aryl groups, aryloxy groups, amino groups, disubstituted amino groups or silanyl groups; formula (III)

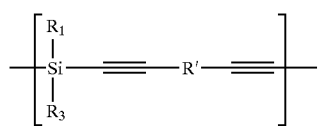

(III)

in which $R_1$ and $R_3$ which may be identical or different, represent a hydrogen atom; an alkyl group having from 1 to 20 carbon atoms, a cycloalkyl group having from 3 to 20 carbon atoms, an alkoxy group having from 1 to 20 carbon atoms, an aryl group having from 6 to 20 carbon atoms, an aryloxy group having from 6 to 20 carbon atoms, an alkenyl group having from 2 to 20 carbon atoms, a cycloalkenyl group having from 3 to 20 carbon atoms, an alkynyl group having from 2 to 20 carbon atoms, one or more of the hydrogen atoms linked to the carbon atoms of $R_1$ and $R_3$ optionally replaced with halogen atoms, alkyl groups, alkoxy groups, aryl groups, aryloxy groups, amino groups, disubstituted amino groups or silanyl groups; and R' represents a group comprising at least two aromatic nuclei comprising from 6 to 20 carbon atoms, linked via at least one covalent bond and/or at least one divalent group;
formula (IV)

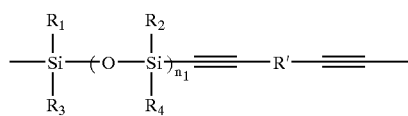

(IV)

in which $R_1$, $R_2$, $R_3$, and $R_4$, which may be identical or different, represent a hydrogen atom; an alkyl group having from 1 to 20 carbon atoms, a cycloalkyl group having from 3 to 20 carbon atoms, an alkoxy group having from 1 to 20 carbon atoms, an aryl group having from 6 to 20 carbon atoms, an aryloxy group having from 6 to 20 carbon atoms, an alkenyl group having from 2 to 20 carbon atoms, a cycloalkenyl group having from 3 to 20 carbon atoms, an alkynyl group having from 2 to 20 carbon atoms, one or more of the hydrogen atoms linked to the carbon atoms of $R_1$, $R_2$, $R_3$ and $R_4$ optionally replaced with halogen atoms, alkyl groups, alkoxy groups, aryl groups, aryloxy groups, amino groups, disubstituted amino groups or silanyl groups; and $n_1$ is an integer from 1 to 10; and R' represents a group comprising at least two aromatic nuclei comprising from 6 to 20 carbon atoms, linked via at least one covalent bond and/or at least one divalent group; and formula (V)

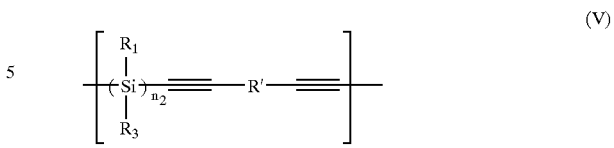

(V)

in which $R_1$ and $R_3$, which may be identical or different, represent a hydrogen atom; an alkyl group having from 1 to 20 carbon atoms, a cycloalkyl group having from 3 to 20 carbon atoms, an alkoxy group having from 1 to 20 carbon atoms, an aryl group having from 6 to 20 carbon atoms, an aryloxy group having from 6 to 20 carbon atoms, an alkenyl group having from 2 to 20 carbon atoms, a cycloalkenyl group having from 3 to 20 carbon atoms, an alkynyl group having from 2 to 20 carbon atoms, one or more of the hydrogen atoms linked to the carbon atoms of $R_1$ and $R_3$ optionally replaced with halogen atoms, alkyl groups, alkoxy groups, aryl groups, aryloxy groups, amino groups, disubstituted amino groups or silanyl groups; R' represents a group comprising at least two aromatic nuclei comprising from 6 to 20 carbon atoms, linked via at least one covalent bond and/or at least one divalent group, said process comprising the reaction of a compound of formula (XVIII):

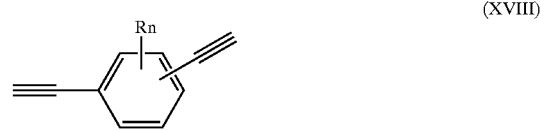

(XVIII)

or of general formula:

(XIX)

in which the phenylene group (general formula (XVIII)) may be in the o, m or p form and R, R' and n have the meaning already given above, as a mixture with a chain-limiting agent of formula (XX):

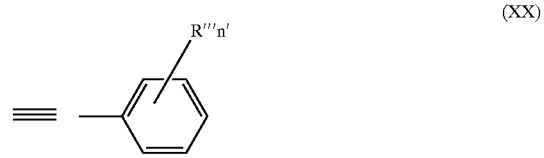

(XX)

in which R''' has the same meaning as R and may be identical to or different from the latter, and n' has the same meaning as n and may be identical to or different from the latter, with a compound of formula (XXI):

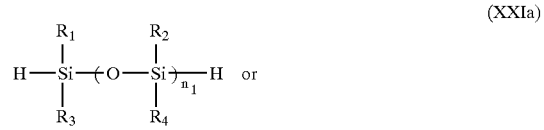

(XXIa)

-continued

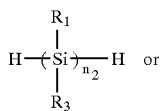 (XXIb)

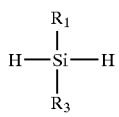 (XXIc)

in which $R_1$, $R_2$, $R_3$ and $R_4$, which may be identical or different, and $n_1$ and $n_2$ have the meaning already mentioned above, in the presence of a basic metal oxide, to give the final compound of formula (I), (II), (III), (IV) or (V), respectively.

27. Process according to claim 25, which in the molar percentage of the chain-limiting agent in the mixture of diacetylenic compounds of formula (XIII) or (XIV) or (XVII) or (XIX) and of chain limiter is from 1% to 60% and preferably from 20% to 50%.

28. Cured product obtainable by heat-treating, at a temperature from 50 to 700° C., the polymer according to claim 1.

29. Cured product according to claim 28, having a number-average molecular mass of 400 to 5000.

30. Cured product according to claim 28, having a weight-average molecular mass of 600 to 10 000.

31. Composite matrix comprising the polymer according to claim 1.

* * * * *